UNITED STATES PATENT OFFICE.

LUDWIG SCHMIDT, OF ARTH, SWITZERLAND, ASSIGNOR TO MARIO ARBINI, OF BASEL, SWITZERLAND.

PROCESS FOR SEPARATING FATTY ACIDS FROM VEGETABLE AND ANIMAL FATS.

1,395,998.     Specification of Letters Patent.     Patented Nov. 1, 1921.

No Drawing.     Application filed March 20, 1920. Serial No. 367,374.

*To all whom it may concern:*

Be it known that I, LUDWIG SCHMIDT, a citizen of the German Republic, and resident of Arth, Canton of Schwyz, Switzerland, have invented a new and useful Process for Separating Fatty Acids from Vegetable and Animal Fats, of which the following is a full, clear, and exact specification.

Methods hitherto used for separating free fatty acids from animal and vegetable fats, as for instance oils, depend upon treatment with aqueous alkalis or with alkali carbonate solutions or with oxids or carbonates of the alkaline earth metals. For the same purpose borax solutions, waterglass solutions and aqueous or gaseous ammonia have been used.

All these known processes have the disadvantage that the aqueous soap which is formed separates only gradually and incompletely from the neutralized fat and the process requires lengthy sedimentation or complicated methods of separation; moreover, the soap incloses considerable quantities of the neutralized fat and carries this away with it, so that the yield of fat is considerably diminished. Added to this is the inconvenience of the repeated washings of the neutralized fat which become necessary in order to remove the whole of the soap dissolved therein, and here again loss is caused and an elaborate washing installation is requisite. The use of salt solutions as the washing liquid is frequently usual but the salting out action involved retards the result to be obtained.

Caustic alkalis, and alkali carbonates, have also been used in dry or moist form for combining with the free fatty acids of the animal and vegetable fats. But this brings with it the inconvenience that the soaps are of a slimy nature and can be separated only with extreme difficulty and incompletely from the neutralized fat.

The ideal method which would render possible the conversion of the free fatty acids into dry alkaline soap ready for use and would at the same time separate quantitatively from the soap a neutral fat ready for use without further treatment, the whole process involving only a single operation, has not yet been devised. Such a method is the object of the present invention, in which the fats are treated with an alkali compound free of water, with exclusion of moisture, and the water produced by the reaction is removed. The process can be carried out by causing a dry caustic alkali or calcined alkali carbonate to act on the dried fat with exclusion of moisture, eliminating or removing completely the water produced by the reaction, in accordance with either of the equations

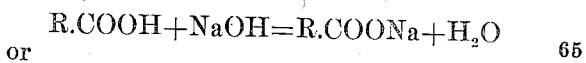

or

taking the neutralized fat up with a suitable anhydrous solvent and separating the soap from the fat by filtration.

When for instance a vegetable or animal oil, is stirred with the proportion of powdered dry caustic soda or calcined sodium carbonate, calculated as equivalent to the free acids present, at the ordinary or a slightly raised temperature, the solid soda soap separates in the form of colloidal clots while the clear neutral oil remains completely unattacked. If, when the reaction is complete, the water produced is drawn off by vacuum or absorbed by calcined sodium sulfate and the treated oil mixed with a suitable solvent free of water, which will take up only the neutralized oil, as for instance methylal, ether, methyl acetate, carbon bisulfid, acetone, etc., simple filtration at the ordinary or raised temperature suffices for quantitatively separating the oil solution free from soap from the dry soap ready for use.

The solvent has then merely to be distilled in a suitable distilling apparatus for obtaining a neutral oil completely free of soap and requiring no further treatment or washing. In any case the yield both of unattacked neutral oil and soap is quantitative.

Instead of adding the solvent to the previously formed mixture of neutral oil and soap the oil to be treated can be dissolved from the beginning in a solvent and the calculated quantity of the alkali compound free of water be added thereto and the neutralization of the free fatty acids according to the invention be effected in presence of the solvent. The soap formation being terminated the soap is filtered off, the oil solution is dried with calcined sodium sulfate and separated from sodium sulfate by filtration and the solvent eliminated by evaporation.

If thorough bleaching of the neutral oil and of soap is to be effected by the process there is substituted for the caustic alkali or the alkali carbonate the corresponding peroxid or percarbonate without changing the mode of operation in any way. This variation of the process is of particular value in the purification of oils or fats for alimentary and medicinal purposes.

The following examples illustrate the invention:

*Example I.*

50 kilos of dry maize oil containing 17 per cent. of free fatty acid are mixed with 1.8 kilos of calcined soda and the mixture is heated at 90–100° centigrade with gentle stirring until the reaction is complete. The water produced is drawn off by vacuum while the mixture is hot, and when the latter is cooled 80 kilos of methylal are stirred in. The clear methylal solution of the neutral oil is separated by suction or by pression, the residue is washed with a little methylal and the solvent is distilled off and can be used again in the next operation. The neutral oil obtained is completely free from soap. The soap forming the residue is freed in a vacuum from traces of adhering methylal and is then ready for use.

*Example II.*

50 kilos of dried whale oil containing 9.2 per cent. of free fatty acid are dissolved in 50 kilos of dry acetone; the solution is mixed with 0.7 kilo of finely ground sodium peroxid and the whole is stirred at the ordinary temperature until all the peroxid has disappeared and the oil is neutral. The separated white soap is centrifuged. The clear acetone solution is dried with calcined sodium sulfate then separated from this latter by filtration and the acetone is distilled off. There is left a thoroughly bleached, completely neutral oil.

What I claim is:

1. A process for separating fatty acids from vegetable or animal fats, in order to obtain at the same time a neutral fat free from soap and a dry alkali soap ready for use, consisting in treating the fats with an alkali compound free of water, with exclusion of water, and removing the water produced by the reaction and separating the soap from the fat by means of a dry solvent dissolving only the neutral fat.

2. A process for separating fatty acids from vegetable or animal fats, in order to obtain at the same time a neutral fat free from soap and a dry alkali soap ready for use, consisting in treating the fats with calcined alkali carbonate with exclusion of water, and removing the water produced by the reaction and separating the soap from the fat by means of a dry solvent dissolving only the neutral fat.

3. A process for separating fatty acids from vegetable or animal fats in order to obtain at the same time a neutral fat free from soap and a dry alkali soap ready for use, consisting in dissolving the fat in a dry solvent, treating the resulting fat solution with an alkali compound free of water, with exclusion of water, separating the soap formed from the fat solution, drying this latter, and eliminating the solvent from the fat by evaporation.

In witness whereof I have hereunto signed my name this 25th day of February, 1920, in the presence of two subscribing witnesses.

LUDWIG SCHMIDT.

Witnesses:
E. FREY EMIL,
CHRISTEN ALOIS.